US010726264B2

(12) United States Patent
Sawhney et al.

(10) Patent No.: US 10,726,264 B2
(45) Date of Patent: Jul. 28, 2020

(54) OBJECT-BASED LOCALIZATION

(71) Applicant: MICROSOFT TECHNOLOGY LICENSING, LLC, Redmond, WA (US)

(72) Inventors: Harpreet Singh Sawhney, Redmond, WA (US); Marc André Léon Pollefeys, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 16/017,893

(22) Filed: Jun. 25, 2018

(65) Prior Publication Data

US 2019/0392212 A1    Dec. 26, 2019

(51) Int. Cl.
*G06K 9/00* (2006.01)
*G06T 7/70* (2017.01)
*G06N 20/00* (2019.01)
*G06K 9/62* (2006.01)
*G06T 7/20* (2017.01)

(52) U.S. Cl.
CPC ..... *G06K 9/00664* (2013.01); *G06K 9/00201* (2013.01); *G06K 9/628* (2013.01); *G06N 20/00* (2019.01); *G06T 7/20* (2013.01); *G06T 7/70* (2017.01); *G06T 2210/12* (2013.01)

(58) Field of Classification Search
CPC ........... G06K 9/00664; G06K 9/00201; G06K 9/628; G06T 7/70; G06T 7/20; G06T 2210/12; G06N 20/00
See application file for complete search history.

(56) References Cited

U.S. PATENT DOCUMENTS

| | | | |
|---|---|---|---|
| 8,649,565 B1 | 2/2014 | Kim et al. | |
| 8,989,483 B2 | 3/2015 | Cheng et al. | |
| 9,807,365 B2 | 10/2017 | Cansizoglu et al. | |
| 2004/0167669 A1* | 8/2004 | Karlsson | G01C 21/12 700/259 |
| 2011/0150271 A1 | 6/2011 | Lee et al. | |
| 2011/0311104 A1 | 12/2011 | Sinha et al. | |
| 2012/0306850 A1 | 12/2012 | Balan et al. | |

(Continued)

OTHER PUBLICATIONS

Dwibedi, et al., "Deep Cuboid Detection: Beyond 2D Bounding Boxes", In Journal of Computing Research Repository, Nov. 2016, 11 Pages.

(Continued)

*Primary Examiner* — Brenda C Bernardi
(74) *Attorney, Agent, or Firm* — NovoTechIP International PLLC

(57) ABSTRACT

Techniques for localizing a device based on images captured by the device. The techniques include receiving, from a device via a data communication network, image frame data for frames captured by an imaging camera included in the device, the frames including a first frame, automatically detecting real-world objects captured in the image frame data, automatically classifying the detected real-world objects as being associated with respective object classes, automatically identifying object class and instance dependent keypoints for the real-world objects based on the object classes associated with the real-world objects, and estimating a pose of the device for the first frame based on at least the identified object class and instance dependent keypoints.

18 Claims, 8 Drawing Sheets

(56) References Cited

U.S. PATENT DOCUMENTS

| | | | |
|---|---|---|---|
| 2013/0254666 | A1 | 9/2013 | Snavely et al. |
| 2014/0010407 | A1 | 1/2014 | Sinha et al. |
| 2014/0270484 | A1 | 9/2014 | Chandraker et al. |
| 2016/0104058 | A1 | 4/2016 | He et al. |
| 2016/0297068 | A1 | 10/2016 | Thibodeau et al. |
| 2016/0358030 | A1 | 12/2016 | Pengelly et al. |
| 2017/0053538 | A1 | 2/2017 | Samarasekera et al. |
| 2017/0161546 | A1 | 6/2017 | Cansizoglu et al. |
| 2017/0169574 | A1 | 6/2017 | Xie et al. |
| 2017/0206431 | A1 | 7/2017 | Sun et al. |
| 2018/0068202 | A1 | 3/2018 | Sala et al. |
| 2018/0075290 | A1 | 3/2018 | Chen et al. |
| 2018/0122136 | A1* | 5/2018 | Lynen ............... G05D 1/0274 |
| 2018/0158197 | A1 | 6/2018 | Dasgupta et al. |
| 2018/0232906 | A1* | 8/2018 | Kim ..................... G06T 7/75 |
| 2019/0080462 | A1* | 3/2019 | Jung ................. H04N 13/271 |
| 2019/0080467 | A1* | 3/2019 | Hirzer ................... G06T 7/73 |

OTHER PUBLICATIONS

Fioraio, et al., "Joint Detection, Tracking and Mapping by Semantic Bundle Adjustment", In Proceedings of the IEEE Computer Society Conference on Computer Vision and Pattern Recognition, pp. 1538-1545, Jun. 2013, 8 Pages.

Huang, et al., "A Coarse-Fine Network for Keypoint Localization", In Proceedings of IEEE International Conference on Computer Vision, Oct. 22, 2017, pp. 3028-3037.

Huang, et al., "DenseBox: Unifying Landmark Localization with End to End Object Detection", In Journal of Computing Research Repository, Sep. 2015, pp. 1-13.

Manley, et al., "Localization and Tracking in Sensor Systems", In Proceedings of the IEEE International Conference on Sensor Networks, Ubiquitous, and Trustworthy Computing, Jun. 5, 2006, 6 Pages.

Martin, et al., "Mapping and Re-Localization for Mobile Augmented Reality", In Proceedings of IEEE International Conference on Image Processing, Oct. 27, 2014, 5 Pages.

Rao, et al., "A Mobile Outdoor Augmented Reality Method Combining Deep Learning Object Detection and Spatial Relationships for Geovisualization", In Journal of Sensors, vol. 17, Issue 9, Aug. 24, 2017, pp. 1-26.

Salas-Moreno, et al., "SLAM++: Simultaneous Localisation and Mapping at the Level of Objects", In Proceedings IEEE Computer Society Conference on Computer Vision and Pattern Recognition, Jun. 2013, 8 Pages.

Sunderhauf, et al., "On the Performance of ConvNet Features for Place Recognition," Proceedings of IEEE International Conference on Intelligent Robots and Systems (IROS), 2015, 8 Pages.

Tekin, et al., "Real-Time Seamless Single Shot 6D Object Pose Prediction," Nov. 29, 2017, 16 Pages.

Tulsiani, et al., "Viewpoints and Keypoints," Computer Vision and Pattern Recognition, 2015, 10 Pages.

Uchiyama, et al., "Object Detection and Pose Tracking for Augmented Reality: Recent Approaches", In Proceedings of in 18th Korea-Japan Joint Workshop on Frontiers of Computer Vision, Feb. 2012, pp. 1-8.

Pavlakos, et al., "6-DoF Object Pose from Semantic Keypoints", In Proceedings of IEEE International Conference on Robotics and Automation, May 29, 2017, 8 Pages.

"International Search Report and Written Opinion Issued in PCT Application No. PCT/US2019/037587", dated Oct. 9, 2019, 13 Pages.

* cited by examiner

OBJECT-BASED LOCALIZATION

BACKGROUND

Localization of a mobile agent, such as a portable device, a robot, or an autonomous vehicle, in various real-world environments is an important capability for smart navigation, location-based services, and mixed reality (MR) experiences. Conventional localization techniques largely employ visual features such as SIFT, ORB, or DAISY to represent a scene and localize a mobile sensor in a scene or camera centered coordinate system. Such techniques include use of various flavors of SLAM (simultaneous localization and mapping) that have been implemented on smartphones, virtual reality (VR)/augmented reality (AR)/MR devices, and autonomous vehicles.

A fundamental problem with such feature-based methods includes the variance and instability of computed features for scenes encountered at different times of day, different times of year, different lighting conditions, changes in viewpoint, and/or features located on moveable or moving objects. Conventional localization techniques fail to provide robustness to such variations, which typically occur in common real-world environments. As a result, building effective and stable visual maps of the world that are robust in facilitating localization of mobile agents remains an unfulfilled dream.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated. The term "techniques" may refer to systems, methods, computer-readable instructions, modules, algorithms, hardware logic and/or operations as permitted by the context described throughout this document. Additionally, the terms "class," "category," "label," and "type" of real-world objects in an image can be considered synonymous terms with regard to the classification of a real-world object.

Figure 1:
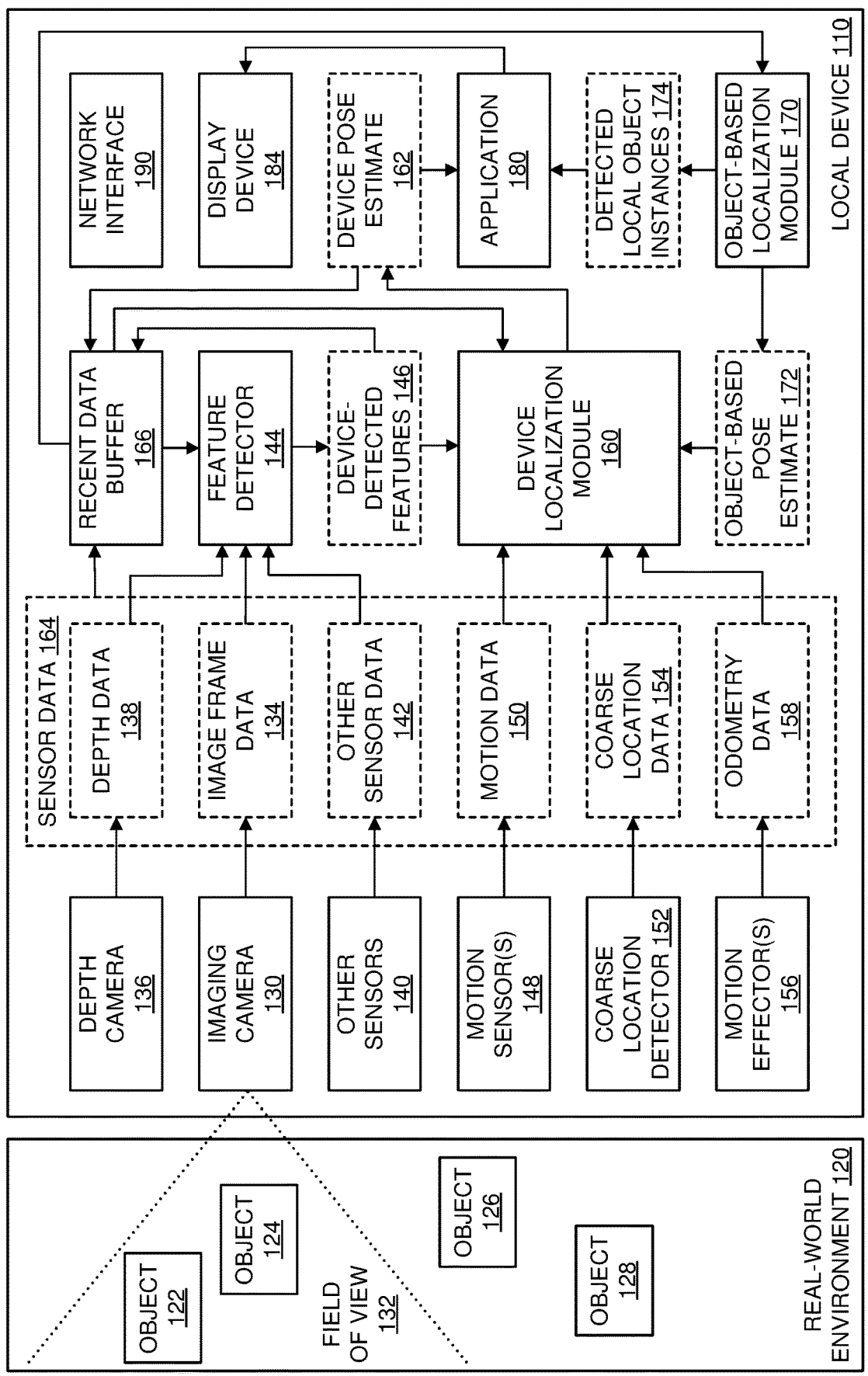
FIG. 1 illustrates an example of a local device that is configured to perform object-based localization based on image frames of a real-world environment and automatic detection and classification of real-world objects captured in the image frames.

FIG. 1 illustrates an example of a local device 110 that is configured to perform object-based localization based on image frames of a real-world environment 120 and automatic detection and classification of real-world objects captured in the image frames. For purposes of this discussion, the term "real-world object" excludes items such as markers (including, for example, fiducials, planar reference images, coded augmented reality (AR) markers, QR codes, and/or bar codes) and items augmented with markers to identify object instances or object classes. In some examples, a real-world object may be referred to as an unaugmented object and/or an unmarked object.

Embodiments of the local device 110 may take many forms such as, but not limited to, virtual reality (VR) devices (including head-mounted devices), AR devices (including head-mounted devices), mixed reality (MR) devices (including head-mounted devices), smartphones, tablet computers, portable computing devices, autonomous vehicles (including cars, trucks, watercraft, submersible vehicles, aircraft, and spacecraft), human-operated vehicles, robots, and video cameras. The local device 110 is arranged to collect sensor data 164 for the real-world environment 120. In some circumstances, the local device 110 is located within the real-world environment 120. In some circumstances, the local device 110 changes its pose (location and/or orientation) within and/or with respect to the real-world environment 120 over time. In the example illustrated in FIG. 1, a first real-world object 122, a second real-world object 124, a third real-world object 126, and a fourth real-world object 128 are located within the real-world environment 120. The real-world objects 122, 124, 126, and 128 may simply be referred to as "objects."

The local device 110 includes at least one digital imaging camera 130 arranged to capture two-dimensional (2D) images, provided as image frame data 134, of one or more areas surrounding the local device 110. The digital imaging camera 130 may be implemented by at least one of an RGB (red-green-blue) camera, a monochromatic (or "black and white") visual spectrum camera, an infrared camera, an RGBI (red-green-blue-infrared) camera, and/or an RGB-D (RGB and depth) camera. The image frame data 134 is captured as 2D image frames, each captured at a respective time. In some examples, the digital imaging camera 130 is configured to capture sequences of frames at a frame rate, which may be selectively configured. For example, the digital imaging camera 130 may be configured to capture a sequence of frames at a frame rate of 1-60 Hz, or greater or lower depending upon the needed update rate for a given application. In some examples, a portion of a frame may be captured and/or provided at selected resolutions. For example, the local device 110 may be configured to ordinarily capture frames of image frame data 134 at a first resolution and selectively capture frames of image frame data 134 at a second resolution, substantially higher than the first resolution, to capture a greater level of detail.

In the example illustrated in FIG. 1, the digital imaging camera 130 has a first field of view (FOV) 132 and, at a first time at which a first frame of image frame data 134 is captured, the first real-world object 122 and the second real-world object 124 are captured in the image frame data 134. When the local device 110 is arranged in a different pose, the field of view 132 of the imaging camera 130 may capture the third real-world object 126 and/or the fourth real-world object 128 in other frames of image frame data 134. In some examples, the local device 110 is configured to change the FOV 132, such as by controlling a level of optical zoom and/or by capturing image frame data 134 for only a subportion of a full frame. In some examples, the imaging camera 130 includes multiple imaging sensors arranged to capture images from multiple different directions, resulting in a larger field of view 132. The resulting field of view 132 is not necessarily contiguous; for example, the imaging camera 130 may include a front-facing imaging sensor and a rear-facing imaging sensor, but not capture side portions.

In some implementations, the local device 110 includes at least one depth camera 136 configured to capture depth data 138 in the form of 2D depth maps providing estimated distances between the local device 110 and respective portions of the real-world environment 120. In some examples, the imaging camera 130 and depth camera 136 are be integrated into a single sensor, such as an RGB-D camera. In some examples, the depth data 138 is produced based on the image frame data 134, such as by stereoscopic depth processing of images captured by two or more imaging cameras 130, by applying a machine learning model to image frame data 134 to estimate depth (for example, by using a convolutional neural network (CNN) trained to estimate depth based on one or more infrared images), or capturing multiple frames by moving the local device 110 and/or imaging camera 130 and using traditional Structure from Motion techniques with or without the use of motion data (such as motion data 150 from motion sensor(s) 148). In some examples, the depth data 138 is captured at a different resolution than the image frame data 134. In some implementations, the local device 110 is configured to synchronize capture of a frame of the depth data 138 with a capture of a frame of the image frame data 134, which simplifies identifying portions of the depth data 138 that correspond to respective portions of the image frame data 134.

In some implementations, the local device 110 includes one or more other sensors 140 arranged to sense and measure features of the real-world environment 120, providing such measurements as other sensor data 142. Examples of the other sensors 140 include proximity sensors (such as, but not limited to, ultrasonic sensors, photoelectric sensors, inductive sensors, contact sensors, laser scanners, and/or magnetic sensors) and/or motion detectors (such as, but not limited to, sensors based on infrared light, ultrasound or microwave/radar technologies).

In some implementations, the local device 110 includes a feature detector 144 configured to detect device-detected features 146 for the real-world environment 120 used for localization performed by the local device 110. For example, the device-detected features 146 may be used as, or to identify, SLAM landmarks. Such features may be detected based on the image frame data 134, the depth data 138, and/or the other sensor data 142, individually or in combination. For example, the feature detector 144 may be configured to detect visual features such as SIFT, ORB, or DAISY features in the image frame data 134. In some examples, the feature detector 144 may be configured to generate device-detected features 146 based on image frame data 134, depth data 138, and/or other sensor data 142 stored in a localization data buffer 166. For example, the feature detector 144 may be configured to identify features based on optical flow analysis of multiple frames of image frame data 134. The device-detected features may include 2D or 3D features, including, for example, points (such as corners), lines, and/or planes.

In some implementations, the local device 110 includes one or more motion sensor(s) 148 configured to measure movement of the local device 110 and provide corresponding motion data 150. In some examples, the motion sensor(s) 148 may include an inertial measurement unit (IMU) including accelerometers (such as a 3-axis accelerometer), gyroscopes (such as a 3-axis gyroscope), and/or magnetometers (such as a 3-axis magnetometer). The resulting motion data 150 may be used for, among other things, dead reckoning of changes in pose and velocity of the local device 110.

In some implementations, the local device 110 includes a coarse location detector 152 configured to provide coarse location data 154 indicating an approximate location of the local device 110. The coarse location detector 152 may be arranged to determine a location of the local device 110 based on signals received from a navigation satellite system, such as, but not limited to, GPS (United States), GLONASS (Russia), Galileo (Europe), and CNSS (China), and technologies augmenting such signals, such as, but not limited to, augmented GPS (A-GPS). The coarse pose detector 152 may be arranged to determine a location of the local device 110 based on radio frequency (RF) signals identifying transmitting devices and locations determined for such transmitting devices. By way of example, Wi-Fi, Bluetooth, Zigbee, RFID, NFC, and cellular communications include device identifiers that may be used for location determination. In some situations, the coarse location detector 152 may be unable to determine a location due to unavailability of useful signals. In some situations, the coarse location detector 152 may provide coarse location data 154 at varying degrees of accuracy due to variations in signal quality.

In some implementations, the local device 110 includes one or more motion effector(s) 156 configured to effect and/or control movement of the local device 110. For example, movement of the local device 110 may be effected and/or controlled by controlling one or more motors, engines, thrusters, rudders, and/or steering controls. In some implementations, the motion effector(s) 156 provide odometry data 158. For example, a portion of the odometry data 158 may be determined based on an encoder mounted on a motor or wheel used to propel the local device 110, or one or more of the motion effector(s) 156 may provide telemetry data.

Each of the image frame data 134, depth data 138, other sensor data 142, motion data 150, coarse location data 154, and odometry data 158 may be referred to as sensor data 164. The image frame data 134, depth data 138, and other sensor data 142 may also be referred to as environmental sensor data, reflecting the sensed state of the real-world environment 120. The imaging camera 130, the depth camera 136, and the other sensors 140 may be referred to as environmental sensors, arranged to sense the state of the real-world environment 120. The coarse location data 154, and odometry data 158 may also be referred to as device sensor data, reflecting the sensed state of the local device 110. The sensor data 164 and the device-detected features 146 may collectively be referred to as sensor-derived data.

The local device 110 includes and is configured to use a recent data buffer 166 to temporarily store and retrieve recently obtained portions of the image frame data 134, the device-detected features 146, and the motion data 150. In some examples, recently obtained portions of the depth data 138 and/or other sensor data 142 may also be temporarily stored in the recent data buffer 166. The data stored in the recent data buffer 166 may be indexed according to a time at which the underlying sensor data was captured, such as according to a wall clock time and/or an image frame number, and may be retrieved for a specified time or range of times. The recent data buffer 166 may be used to store and retrieve other data generated by the local device 110 in connection with pose estimation.

The local device 110 includes a device localization module 160 configured to determine a device pose estimate 162, indicating an estimated pose of the local device 110 at a particular time, such as a current time. Various techniques, such as SLAM techniques, may be applied to estimate the pose based on at least the device-detected features 146, motion data 140, coarse location data 154, and/or odometry data 158 described above. In some examples, the client localization module 160 is configured to retrieve such sensor-derived data from the recent data buffer 166. The resulting device pose estimate 162 includes an estimated position (such as a 2D or 3D position) and may include an estimated orientation (with one to three degrees of freedom). In some examples, the device localization module 160 is configured to determine an estimated velocity (positional and/or rotational) and/or an estimated acceleration (positional and/or rotational) of the local device 110.

In some examples, components of the device pose estimate 162 are specified with respect to a client map coordinate system. For example, the local device 110 may define and use a client map coordinate system based on, for example, a pose of the local device 110 at a particular time or a detected pose of one or more features detected in the real-world environment 120. In some examples, in response to determining a pose of the local device 110 with respect to a global and/or local coordinate system (which may be referred to as a "shared" or "common" coordinate system associated with the real-world environment 120 and/or a current location, for aligning coordinates and/or coordinate systems used by various devices and applications), the device localization module 160 specifies components of the device pose estimate 162 with respect to the global and/or local map coordinate system.

The local device 110 may be configured to use the device localization module 160 to determine a current device pose estimate 162 for a current time. The local device 110 may be configured to the device localization module 160 to determine a frame device pose estimate 162 for a time at which a particular frame of the image frame data 134 was captured. In some examples, a frame device pose estimate 162 is determined for each frame of the image frame data 134 stored in, and/or retrieved from, the recent data buffer 166, which facilitates correlating portions of multiple image frames captured at different times from different poses. In some implementations, the device localization module 160 is configured to produce a future device pose estimate 162 for a specified future time, to facilitate the local device 110 performing operations based on predicted changes in pose and facilitating achieving real-time performance. For example, an application 180 executed by the local device 110 may request a future device pose estimate 162 from the device localization module 160 for a future time corresponding to display of an image on a display device 184 to coordinate positioning of the image with movement of the local device 110.

The local device 110 includes an object-based localization module 170 (which may also be referred to as an "object-based mapping and localization module") configured to estimate a pose of the local device 110 based on at least information associated with real-world objects detected and classified based on portions of the image frame data 134, such as portions of the image frame data 134 stored in, and retrieved from, the recent data buffer 166. For example, the object-based localization module 170 may detect and classify the first real-world object 122 and/or the second real-world object 124 in image frame data 134 captured for the field of view 132 shown in FIG. 1. Further details of the object-based localization module 170 are described in connection with FIGS. 2-4. In some implementations, the object-based localization module 170 identifies detected local object instances 174 for real-world objects detected by the object-based localization module 170 (which may include, for example, objects outside of the immediate field of view 132, such as the third real-world object 126 and/or the fourth real-world object 128). The detected local object instances 174 may be used by, for example, the application 180 to perform actions responsive to the identified real-world objects. In such implementations, additional object detection and classification processing for the application 180 can be reduced or eliminated entirely.

The object-based localization module 170 provides an object-based pose estimate 172 providing an estimated pose of the local device 110. In some circumstances, the object-based pose estimate 172 is more accurate and/or precise than a device pose estimate 162 produced by the device localization module 160 based only on the device-detected features 146, motion data 140, coarse location data 154, and/or odometry data 158. The device localization module 160 is configured to receive the object-based pose estimate 172 and generate device pose estimates 162 based on the object-based pose estimate 172, in addition to the device-detected features 146, motion data 140, coarse location data 154, and/or odometry data 158.

As object detection and classification, location determination, and other activities performed to generate an object-based pose estimate 172 may involve significant amounts of processing time, there may be substantial latency between capturing an image frame and receiving an object-based pose estimate 172 corresponding to the image frame. Thus, the device localization module 160 may be configured to account for the "age" of the object-based pose estimate 172 and device-detected features 146, motion data 140, coarse location data 154, and/or odometry data 158 obtained after the capture of the image frame associated with the object-based pose estimate 172.

Additionally, updates in the object-based pose estimate 172 may be provided to the device localization module 160 substantially less frequently than the sensor data 164 is updated. For example, although the imaging camera 130 may be configured to capture new frames at a rate of 60 FPS, new object-based pose estimates 172 may only be provided a few times a second, or even slower. Multiple device pose estimates 162 may be generated between object-based pose estimates 172, based on sensor-derived data for sensor measurements captured since the most recently received object-based pose estimate 172. This allows the local device 110 to obtain the benefit of more accurate and/or precise object-based pose estimates 172, while offering real-time responsiveness to the most recently available sensor data 164.

In some implementations, the local device 110 includes at least one display device 184. For example, a head-mounted VR/AR/MR device embodiment of the local device 110 may include at least one head-mounted display device. As noted above, images may be displayed to a user via the display device 184 under control of the application 180. In some implementations, the local device 110 includes a network interface 190 for communicating with other systems via one or more data communication networks.

Figure 2:
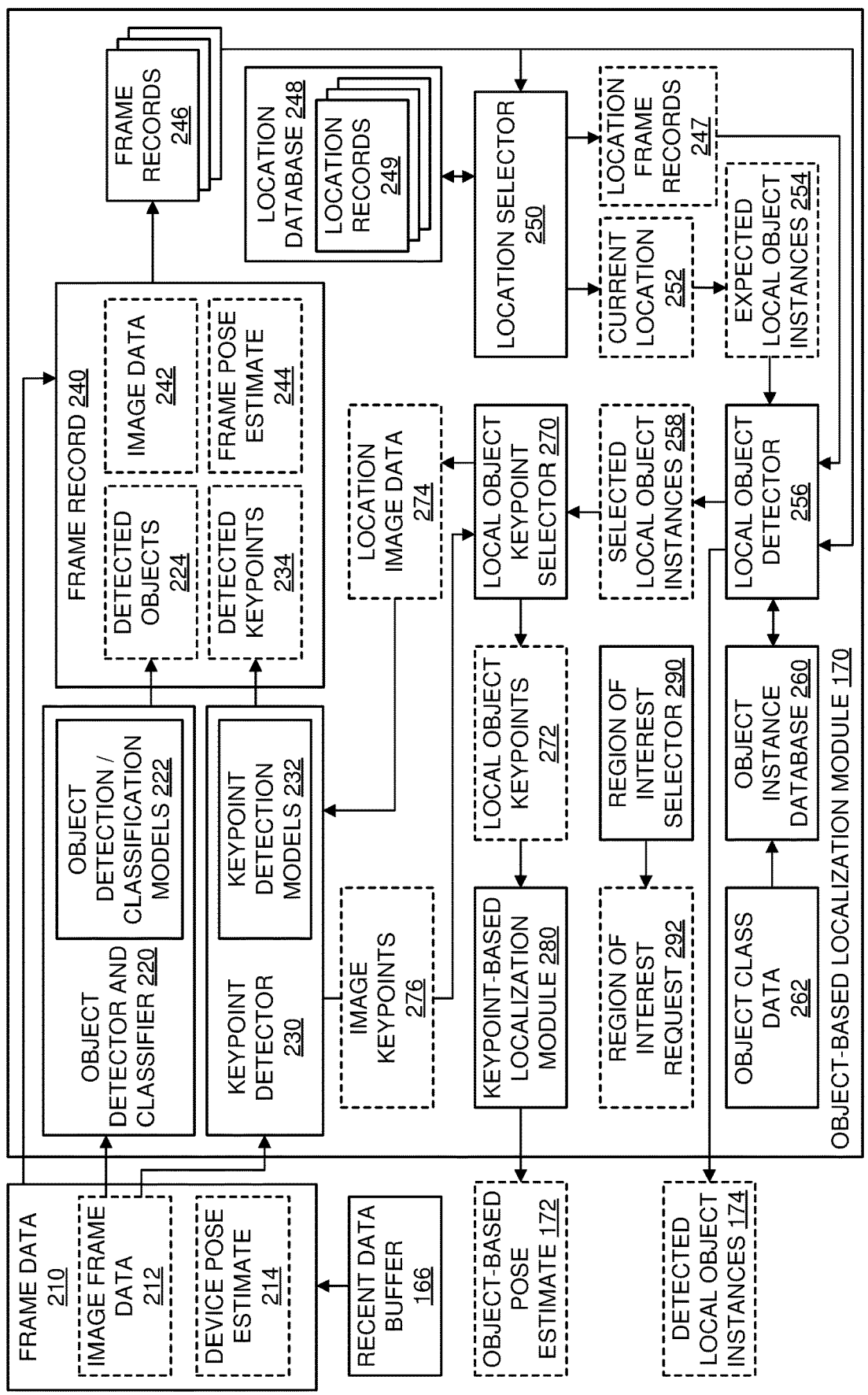
FIG. 2 illustrates an example of the object-based localization module shown in FIG. 1.

FIG. 2 illustrates an example of the object-based localization module 170 shown in FIG. 1. Data for a frame of the image frame data 134 is provided to the object-based localization module 170 as frame data 210, which includes image frame data 212 based on the image frame data 134 captured for the frame and a device pose estimate 214 provided by the device localization module 160 for a time at which the frame was captured. In some examples, a portion of the image frame data 212 may be based on depth data 138 captured at approximately the time at which the frame was captured. In some examples, as illustrated in FIG. 2, the frame data 210 may be retrieved from the recent data buffer 166. The image frame data 212 may include a subsampled portion of the image frame data 134 stored in the recent data buffer 166. In some implementations, only a selected subportion of the frames captured by the imaging camera 130 are provided to the object-based localization module 170, which may serve to reduce an amount of processing performed for image-based object detection and classification. However, in some implementations, every frame captured by the imaging camera 130 is provided to the object-based localization module 170. The object-based localization module 170 generates an object-based pose estimate 172 based on frame data 210 received from the local device 110, although not every frame provided to the object-based localization module 170 necessarily results in the object-based localization module 170 generating a respective object-based pose estimate 172.

A rate at which frames are provided to the object-based localization module 170 may change dynamically in response to various factors. A determination on whether to submit a new frame may be based at least in part on a difference between a pose for the last submitted frame and a pose for the new frame being greater than or equal to a threshold amount. This reduces redundant data being provided to the object-based localization module 170. A determination on whether to submit a new frame may be based on at least an amount of time since the last frame was submitted being greater than or equal to a threshold amount. A determination on whether to submit a new frame may be based on at least data received from the object-based localization module 170. For example, the object-based localization module 170 may request a change in frequency of frame submission or identify a portion of the real-world environment 120 for which additional image data is desired.

The object-based localization module 170 includes an object detector and classifier 220 (which may be referred to as an "object detector") which is configured to receive image frame data, such as the image frame data 212 included in the frame data 210, and automatically detect and classify real-world objects captured in the received image data. Object detection includes identifying where in an image a real-world object has been captured; for example, by identifying a region of interest corresponding to a detected real-world object. The object detector and classifier 220 may use one or more object detection/classification models 222 to detect real-world objects captures in image frame data and determine an object classification of each detected real-world object. In some examples, an object detection/classification model 222 included in the object detection/classification models 222 may be configured to detect real-world objects, classify real-world objects, or both. For example, a first object detection/classification model 222 may be used to detect real-world objects, and a second object detection/classification model 222 used to classify the detected real-world objects.

In some examples, one or more of the object detection/classification models 222 may each specify parameters (for example, weighting values) for a machine learning algorithm, such as a convolutional neural network (CNN), one or more decision trees, or a random forest, trained to detect and/or classify real-world objects captured in image data supplied to the machine learning algorithm. Algorithms such as YOLO, Fester-RCNN, and SSD-Net have demonstrated high levels of detection performance for many real-world object classes in both indoor and outdoor real-world environments. Various object detection and classification techniques are described in U.S. Patent Application Publication Nos. 2018/0075290 (published on Mar. 15, 2018 and entitled "Object Detection Based on Joint Feature Extraction"), 2018/0068202 (published on Mar. 8, 2018 and entitled "Real-Time, Model-Based Object Detection and Pose Estimation"), 2017/0206431 (published on Jul. 20, 2017 and entitled "Object Detection and Classification in Images"), 2016/0358030 (published on Dec. 8, 2016 and entitled "Server-Assisted Object Recognition and Tracking for Mobile Devices"), 2016/0297068 (published on Oct. 13, 2016 and entitled "Automated Collection and Labeling of Data"), and 2016/0104058 (published on Apr. 14, 2016 and entitled "Generic Object Detection in Images"), each of which is incorporated by reference herein in their entireties.

In some examples, an object detection/classification model 222 is configured to, based on a provided image data, generate a plurality of outputs, with each output being for a respective object class and the output providing a certainty or confidence value (for example, a value between 0 and 1) that a detected real-world object is an instance of the object class. Whether an object class is associated with a real-world object may be based on whether an output certainty or confidence is greater than or equal to a threshold value. In some examples, the object detector and classifier 220 may detect and classify multiple real-world objects in an image frame data. In some examples, the object detector and classifier 220 may determine that a detected real-world object may be classified as being associated with multiple object classes, and classify the detected object accordingly.

The vocabulary for detected objects and object classes may be extended by using object detection convolutional networks trained to learn representations of real-world objects and/or object classes in general. Intermediate layers of such convolutional networks have been shown to learn representations of object in general without specialization to a predefined set of object classes (for example, a predefined set of object categories in a hand-annotated training data set, such as ImageNet). In some examples, an object class output by an object detection/classification model 222 and/or the object detector and classifier 220 may be a vector of learned feature representations based on values extracted from one or more intermediate layers of a convolutional network. Examples of identifying performant and robust mid-level features and the intermediate layers of a convolutional network in which they are found are described in Sünderhauf, Niko; et al., "On the Performance of ConvNet Features for Place Recognition," Proceedings of IEEE International Conference on Intelligent Robots and Systems (IROS), 2015, which is incorporated by reference herein in its entirety.

Some or all of the detected objects 224 (which may also be referred to as "classified objects" or "detected and classified objects") detected in the image frame data 212 by the object detector and classifier 220 are included in a frame record 240 created for the frame data 210, along with image data 242 from the frame data 210 (which may be a subportion of the image frame data 212) and a frame pose estimate 244 based on the device pose estimate 214 included in the frame data. The frame record 240 is stored as one of a plurality of frame records 246 created by the object-based localization model 170 for the local device 110. In some implementations, a portion of the object detector and classifier 220 may be provided by an external service.

A subset of one or more of the object detection/classification models 222 may be selected for use with a particular frame data 210. The subset of object detection/classification models 222 may be selected based on at least an estimated current geographic location of the local device 110. For example, geofencing may be used to identify a geographic region and one or more preferred object detection/classification models 222 to be used within the identified region. The subset of object detection/classification models 222 may be selected based on at least a scene type determined for a real-world environment. For example, the object-based localization module 170 may include a scene classifier (not shown in FIG. 2) configured to determine a scene class based on image frame data for one or more frames. The subset of object detection/classification models 222 may be selected based on at least an object detection/classification model 222 previously used for a nearby location and/or an object class previously detected in a nearby location. For example, a generalized object detection/classification model 222 may be used initially for a location and a more specialized object detection/classification model 222 selected based on an object class detected using the generalized object detection/classification model 222. The specialized object detection/classification model 222 may offer more effective object detection and classification and/or perform object detection and classification more efficiently.

Figure 3A:
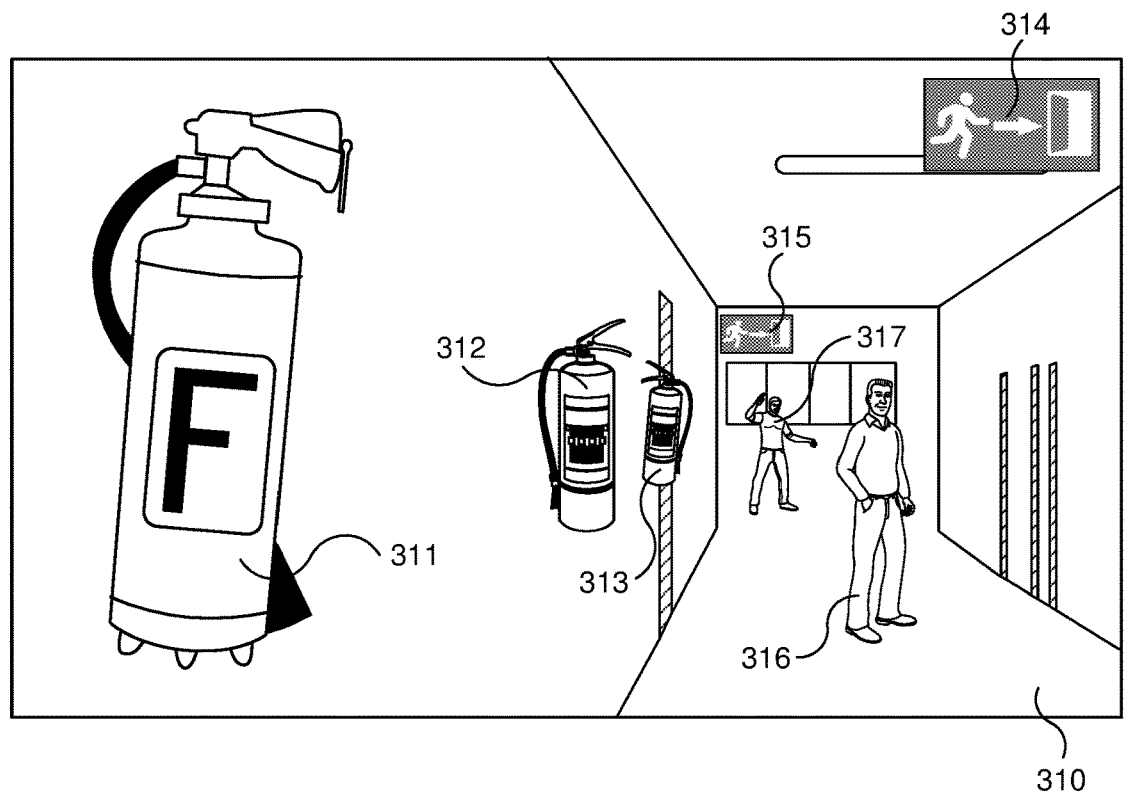
FIGS. 3A and 3B depict an example of real-world object detection and classification performed by the object detector and classifier shown in FIG. 2.
Figure 3B:
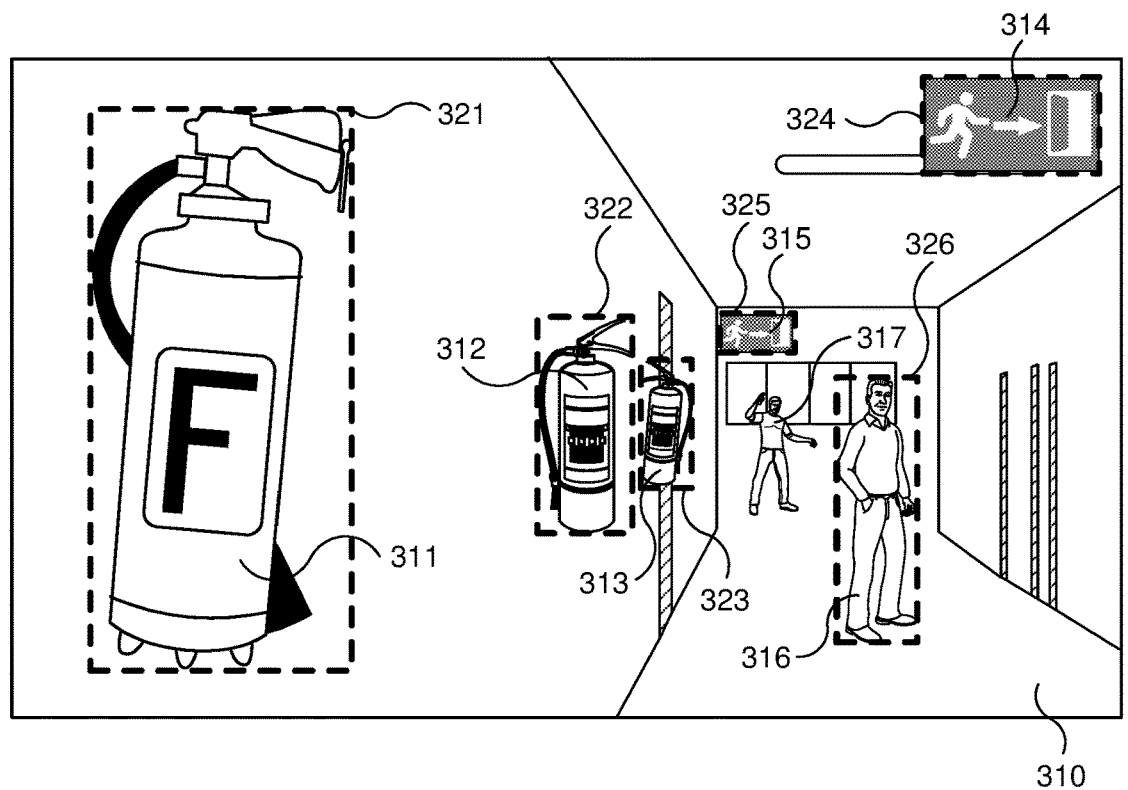
Figure 3C:
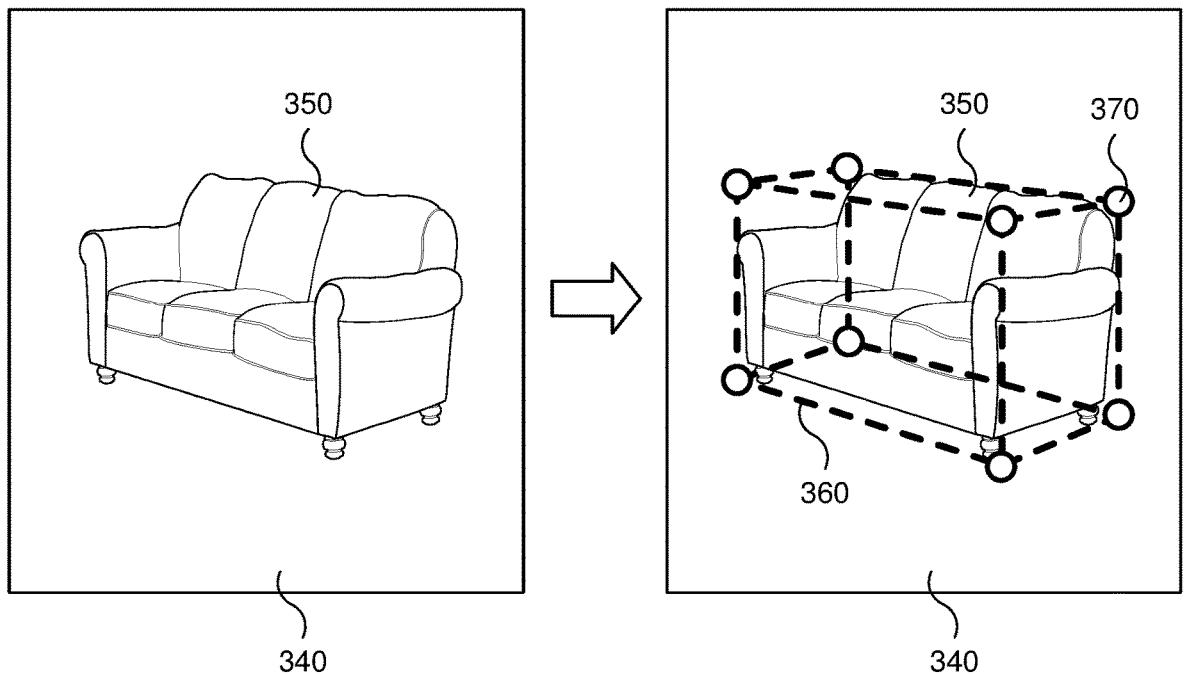
FIG. 3C illustrates an example in which an object detector and classifier automatically determines a three-dimensional bounding box and/or a pose for a couch included in an image frame data.

FIGS. 3A and 3B depict an example of real-world object detection and classification performed by the object detector and classifier 220 shown in FIG. 2. FIG. 3A shows, as a 2D image, an image frame data 310 captured in a hallway real-world environment. Various items have been captured in the image frame data 310, including image data corresponding to three wall-mounted fire extinguishers 311, 312, and 313, two exit signs 314 and 315, and two humans 316 and 317. FIG. 3B graphically depicts, with respective bounding boxes, six detected objects 321, 322, 323, 324, 325, and 326 that the object detector and classifier 220 detected in the image frame data 310 and classified in connection with respective items 311, 312, 313, 314, 315, and 316. Other items that may be of interest and use for object detection and classification in indoor real-world environments include, but are not limited to, fixed infrastructural elements such as doors, windows, labels on storefronts and rooms, office infrastructure, and restroom signs. In this example, the object detector and classifier 220 has classified each of the detected objects 321, 322, and 323 as instances of a first object class "fire_extinguisher" associated with fire extinguishers; each of the detected objects 324 and 325 as instances of a second object class "ceiling_exit_sign" associated with exit signs; and the detected object 326 as an instance of a third object class "human" associated with humans. However, although the human 317 is captured in the image frame data 310, the object detector and classifier 220 was unable to detect it as a real-world object and/or determine an associated object class. The bounding boxes for the detected objects 321, 322, 323, 324, 325, and 326 identify respective rectangular portions of the image frame data 310. In some examples, pixel-level segmentation of objects may be performed by the object detector and classifier 220. FIG. 3C illustrates an example in which an object detector and classifier automatically determines a three-dimensional (3D) bounding box 360 and/or a pose for a couch 350 included in an image frame data 340.

Returning to the description of FIG. 2, in some implementations, the object-based localization module 170 includes a scene classifier (not shown in FIG. 2) which is configured to receive image frame data, such as the image frame data 212 included in the frame data 210, and automatically classify a scene captured in the received image data, resulting in a scene classification (not shown in FIG. 2) that may be stored in the frame record 240. Much as described for the object detector and classifier 220, the scene classifier may be implemented using one or more scene classification models specifying parameters (for example, weighting values) for a machine learning algorithm, such as a convolutional neural network (CNN), one or more decision trees, or a random forest, trained to detect various classes of objects within image data supplied to the machine learning algorithm.

The object-based localization module 170 includes an object class and instance dependent keypoint detector 230 (labeled as a "keypoint detector" in FIG. 2) which is configured to receive image frame data, such as the image frame data included in the frame data 210, and automatically detect object class and instance dependent keypoints for objects captured in the received image data based on the classifications of those real-world objects. In some examples, a keypoint may be referred to as a "feature point." The object class and instance dependent keypoint detector 230 may use one or more keypoint detection models 232 to detect object class and instance dependent keypoints. In some implementations, the object class and instance dependent keypoint detector 230 is configured to select one of multiple keypoint detection models 232 based on at least an object class associated with a detected object 224. For example, one or more of the keypoint detection models 232 may each specify parameters (for example, weighting values) for a machine learning algorithm, such as a convolutional neural network (CNN), one or more decision trees, or a random forest, trained to detect object class and instance dependent keypoints for various classes of objects within image data supplied to the machine learning algorithm. Training data items for training a machine learning based keypoint detection model 232 can be produced using 2D images of real-world objects (which, for some items, may have accompanying hand-annotated features) and/or 3D object models. When generating 2D training images from 3D object models, keypoints (located at, for example, projecting portions) may be identified for the 3D object model and also rendered to create training data items for the 3D model from a variety of viewpoints. Deep learning networks have been demonstrated as effective for predicting keypoints when trained using such training data items.

Some or all of the detected object class and instance dependent keypoints 234 (labeled "detected keypoints" in FIG. 2) detected in the image frame data 212 by the object class and instance dependent keypoint detector 230 are included in the frame record 240 for the frame data 210. For each detected object class and instance dependent keypoint 234, a location (such as a 2D coordinate in a frame or image) and an associated descriptor may be specified. In some examples, confidence values may be specified for one or more of the object class and instance dependent keypoints. In some implementations, the object detector and classifier 220 may be configured to also operate as the object class and instance dependent keypoint detector 230.

The object-based localization module 170 includes a location selector 250 configured to identify and select a current location record 252 (which may be referred to as a "current location") from among multiple locations records 249 maintained by, and accessible from, a location database 248 (which may be referred to as a "location record database"). The location selector 250 (which may be referred to as a "location record selector") is configured to select one or more location frame records 247 from the frame records 246, including the most recently received frame (for example, the frame record 240). For example, the location frame records 247 may be selected based on the frame pose estimates 244 included in the frame records 246, to select frames captured in proximity to the most recently received frame. In some examples, the frame pose estimates 244 for the location frame records 247 may be used to select one or more candidate location records from the location record 249 based on their proximity to the frame pose estimates 244. Thus, even where the local device 110 may only initially provide a coarse location, such as a navigation satellite system-derived location, the number of candidate location records 249 compared against the location frame records 247 may be significantly reduced.

In some implementations, the object-based localization module 170 is configured to selectively discard frame records 246, to limit an amount of storage used for the frame records 246. For example, the object-based localization module 170 may be configured to discard frame records 246 according to a least recently used (LRU) policy based on, for example, selection of frame records 246 as location frame records 247. Selection of frame records 246 to be discarded may be performed at least in part on a per-device basis.

The location selector 250 is further configured to select the location record 249 in the location database 248 with the greatest correlation to the information in the location frame records 247 as the current location record 252. In some circumstances, the location selector 250 is unable to identify a location record 249 in the location database 248 that corresponds to the location frame records 247 or the most recently received frame; for example, when the local device 110 encounters a new location not previously processed by the object-based localization module 170 and/or the location selector 250, no corresponding location record 249 may have yet been created. In response to a determination that the location database 248 does not include a location record 249 corresponding to the location frame records 247, the location selector 250 is configured to create a new location record 249 in the location database 248 based on information included in the location frame records 247, and select the newly created location record 249 as the current location record 252. If at a later time it is determined that the newly created location record 249 describes a same, or approximately the same, location as another location record 249 in the location database 248, those two location records 249 may be merged into a single location record 249 in the location database 248. For example, frame pose estimates 244 for the location frame records 247 may identify or suggest a significantly incorrect location for the local device 110 (for example, due to an incorrect navigation satellite system-derived location) that initially frustrates location selector 250 from identifying and selecting a preexisting location record 249 in the location database 248 that corresponds to an actual location of the local device 110.

Various approaches may be used for evaluating a degree of correlation between the location frame records 247 and the candidate location records, and an approach may be selected based on the information currently available in the location frame records 247. In a first approach, a histogram of object classes for object instances previously identified in connection with a location record 249 is stored in association with the location record 249 and/or may be generated based on object instances identified by the location record 249. The location selector 250 may be configured to select one or more candidate location records with histograms of object classes closely correlated to the object classes identified in the location frame records 247. For example, the location selector 250 may be configured to generate a histogram of the object classes of the detected objects 224 in the location frame records 247, and perform histogram-based comparisons against histograms for the candidate location records. Where only one such candidate location record is selected, it is used as the current location record 252. In some examples, multiple location records 249 with substantially similar correlations (for example, within a threshold distance) to the object classes identified in the location frame records 247 may be selected as the candidate location records, thereby reducing a number of candidate location records to be evaluated. Where there are multiple remaining candidate location records, other approaches may be applied to select a single current location record 252 for subsequent operations.

In a second approach, information corresponding to a relative physical arrangement of object instances previously identified for a location record 249 is stored in association with the location record 249 and/or may be generated based on object instances identified by the location record 249. The location selector 250 may be configured to select one or more candidate location records based on the relative physical arrangements of object instances for the selected candidate location records being closely correlated to relative physical arrangements of the detected objects 224 in the location frame records 247. In some implementations, an amount of correlation may be determined in part based on object classes for the object instances. In some examples, the location selector 250 may be configured to apply a signature-based comparison, in which the location selector 250 generates a first signature based on a relative arrangement of the physical locations of the detected objects 224 in the location frame records 247, and compares the first signature against similar signatures obtained for the location records 249. Where only one such candidate location record is selected, it is used as the current location record 252. The second approach may be used where relative physical arrangements of object instances may be determined from the information included in the location frame records 247, such as detected objects 224 and frame pose estimates 244 indicated therein. For example, multiview reconstruction techniques may be applied to multiple location frame records 247 to determine relative physical arrangements of object instances detected in multiple location frame records 247.

In a third approach, where object class and instance dependent keypoints have been detected for the location frame records 247, the candidate location record with previously detected object class and instance dependent keypoints having the greatest correlation to the detected object class and instance dependent keypoints 234 in the location frame records 247 is selected as the current location record 252. In the third approach, RANSAC iterations may be used for evaluating these correlations. In some examples, the location selector 250 may remove frame records from, or add selected frame records 246 to, the location frame records 247, based on their degrees of correlation with the selected current location record 252.

The object-based localization module 170 is configured to identify a set of expected local object instances 254 identified by the current location record 252. The local object instances 254 identify specific object instances recorded in an object instance database 260 (for example, in corresponding object instance records) that were previously identified in association with the current location record 252. The object instance database 260 maintains persistent data about real world objects. Additionally, object class data 262 describing various object classes associated with the object instances maintained by the object instance database 260 is available. For example, the object class data 262 may indicate whether various object classes are categorized as non-stationary real-world objects (which may be referred to as "non-stationary object classes" or "movable object classes") or are categorized as stationary real-world objects which may be referred to as "stationary object classes"). In some implementations, a degree to which an object class is classified as stationary or non-stationary may be indicated with a value within a range, such as a value within a range between 0 to 1, and a threshold value may be used to determine whether the object class is treated as stationary or non-stationary. In such implementations, the values may be adjusted based on detected behavior of object instances over time. For example, a first "chair" object class may be assigned a value of zero at a first time, with zero indicating a strong stationary classification, but based on repeated detections of changes in location and/or pose of instances of the first object class, the value may be increased to reflect a more non-stationary classification for the first object class.

The object-based localization module 170 includes a local object instance detector 256 (labeled as a "local object detector" in FIG. 2) which is configured to determine, based on at least the detected objects 224 identified in the location frame records 247, which of the expected local object instances 254 have been detected in frame data 210 received from the local device 110 for recently received frames, identifying these as detected local object instances 174. The local object detector 256 is further configured to select a portion of the detected local object instances 174 as selected local object instances 258 for further processing by the object-based localization module 170.

In some implementations, the local object instance detector 256 is configured to exclude detected local object instances 174 from the selected local object instances 258 in response to the excluded detected local object instances 174 not being associated with a stationary object class (or, in some examples, being associated with a non-stationary object class). In a hypothetical example in which the detected local object instances 174 includes a first object instance associated with a first object class for windows that is categorized as stationary and a second object instance associated with a second object class for chairs that is categorized as non-stationary (and/or not categorized as stationary), the first object instance is included in the selected local object instances 258 and the second object instance, based on its association with a non-stationary object class (or based on it not being associated with a stationary object class), excluded from the selected local object instances 258. As a result, pose estimation performed based on the selected local object instances 258 will ignore, and not be based on, detected instances of non-stationary object classes and object class and instance dependent keypoints identified for such object instances. In some implementations, the location selector 250 is configured to ignore detected objects 224 that are not associated with a stationary object class. In some implementations, the object-based localization module 170 is configured to exclude object instances that not associated with a stationary object class from the detected objects 224 in the frame records 246.

In some implementations, the local object instance detector 256 is configured to, based on a determination that a detected local object instance 174 has moved, exclude the moving detected local object instance 174 from the selected local object instances 258. As a result, pose estimation performed based on the selected local object instances 258 will ignore, and not be based on, real-world objects that have been determined to be moving. Example techniques for identifying moving objects are described in U.S. Patent Application Publication Nos. 2017/0169574 (published on Jun. 15, 2017 and entitled "Motion Detection of Object") and 2011/0150271 (published on Jun. 23, 2011 and entitled "Motion Detection Using Depth Images"), both of which are incorporated by reference herein in their entireties. In some implementations, the location selector 250 is configured to ignore detected objects 224 that have been determined to be moving objects. In some implementations, the object-based localization module 170 is configured to exclude object instances that have been determined to be moving objects.

In some circumstances, the object instance database 260 does not include an object instance record corresponding to a detected object 224 identified for the location frame records 247. The local object detector 256 is configured to, in response to a determination that the object instance database 260 does not include an object instance corresponding to a detected object 224 identified for the location frame records 247, create a new object instance record in the object instance database 260 corresponding to and based on information determined for the detected object 224 and include the newly created object instance in the detected local object instances 174. Additionally, the current location record 252 may be updated to identify the newly created object instance record as being associated with the current location record 252.

In some implementations, some or all of the operations and features described for the location selector 250 and the local object detector 256 may be combined. For example, correlations between object instances and/or object class and instance dependent keypoints identified for location records 249 in the location database 248 and detected objects 224 and/or detected object class and instance dependent keypoints 234 in the location frame records 247 may be used to select the current location record 252 from the location records 249 in response to the selected current location record 252 being the most closely correlated of the location records 249.

Figure 3D:
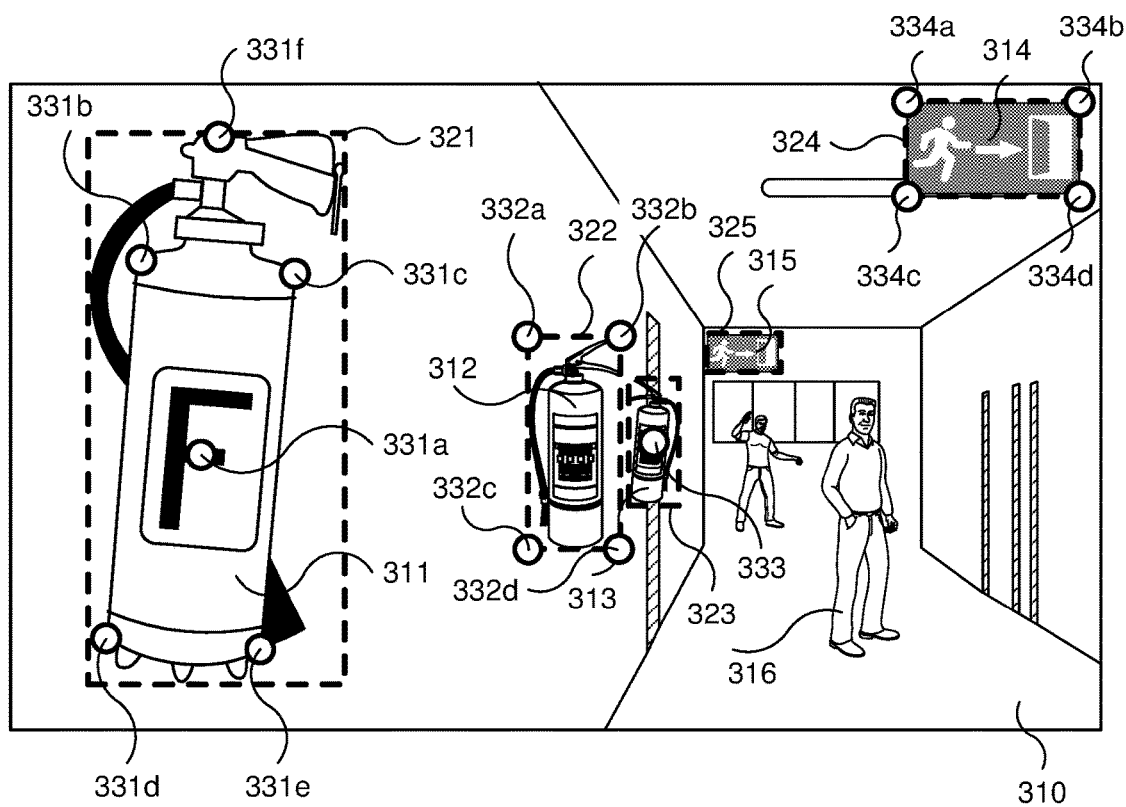
FIG. 3D illustrates various examples of object class and instance dependent keypoints being detected for the detected objects in FIG. 3B according to various techniques.

The object-based localization module 170 includes a local object class and instance dependent keypoint selector 270 (labeled as a "local object keypoint selector" in FIG. 2) configured to identify local object class and instance dependent keypoints 272 (labeled as a "local object keypoints" in FIG. 2) in the image data 242 of the location frame records 247 for the detected local object instances 174. FIG. 3D illustrates various examples of object class and instance dependent keypoints being detected for the detected objects 321, 322, 323, and 324 in FIG. 3B according to various techniques. In this example, the object class and instance dependent keypoint detector 230 applies a keypoint detection model 232 to the detected objects 321, 322, and 323 in the image frame data 310 that has been trained to identify object class and instance dependent keypoints associated with particular portions of instances of the first object class "fire_extinguisher" described in FIG. 3B.

In some implementations, vertices of a bounding box may be selected as object class and instance dependent keypoints for an object instance in response to a keypoint detection model 232 failing to detect object class and instance dependent keypoints for an object instance. FIG. 3D illustrates an example in which object class and instance dependent keypoints 332a, 332b, 332c, and 332d have been identified for respective corners of the bounding box for the detected object 322 in response to such a failure. In general, vertices of 2D bounding boxes have poor pose invariance. However, vertices of 3D bounding boxes have significantly better viewpoint invariance (assuming accurate bounding box estimation occurs from different viewpoints under current environmental conditions), such as an object class and instance dependent keypoint 370 corresponding to a vertex of the bounding box 360 in FIG. 3C. In some implementations, a centroid of a bounding box may be selected as an object class and instance dependent keypoint for an object instance in response to a keypoint detection model 232 failing to detect object class and instance dependent keypoints for the object instance, as illustrated by the object class and instance dependent keypoint 333 for the object instance 323. Various techniques for automatically identifying keypoints, model-based landmarks, 3D bounding boxes, an object poses from image data are discussed in Tulsiani, Shubham; et al., "Viewpoints and Keypoints," Computer Vision and Pattern Recognition, 2015 and Tekin, Bugra; et al., "Real-Time Seamless Single Shot 6D Object Pose Prediction," Nov. 29, 2017, both of which are incorporated by reference herein in their entireties.

Returning to the discussion of FIG. 2, in some implementations, rather than applying the object class and instance dependent keypoint detector 230 to the image frame data 212 shortly after it is received by the object-based localization module 170, the local object class and instance dependent keypoint selector 270 is configured to submit location image data 274 obtained from the image data 242 of the location frame records 247 is provided to the object class and instance dependent keypoint detector 230, which responds with detected object class and instance dependent keypoints 276, as previously described for detected object class and instance dependent keypoints 234. The received detected object class and instance dependent keypoints 276 for image data 242 included in a frame record 246 may be stored as detected object class and instance dependent keypoints 234 in the frame record 246. In this way, the received detected object class and instance dependent keypoints 276 may be used in a later operation of the location selector 250 to identify a current location record 252 with the benefit of the detected object class and instance dependent keypoints 276.

In some implementations, the location selector 250 is configured to utilize previously detected object class and instance dependent keypoints in frame records 246, recorded as detected object class and instance dependent keypoints 234, to select the current location record 252 from the location records 249 in the location database 248. For example, selection of the current location record 252 may be based at least in part on a degree of correlation between the current location record 252 and the detected object class and instance dependent keypoints 234 for the location frame records 247.

The object-based localization module 170 includes an object class and instance dependent keypoint-based localization module 280 (labeled as a "keypoint-based localization module" in FIG. 2), which is configured to generate the object-based pose estimate 172 based on the local object class and instance dependent keypoints 272 for the selected local object instances 258. In some example, the pose estimation may further be based on object class and instance dependent keypoint information indicated by the current location record 252 and/or in the object instance database 260 for the selected local object instances 258. Each selected local object instance 258 and its local object class and instance dependent keypoints 272 is localized in three dimensions using multiview reconstruction techniques such as Structure from Motion. In some examples, the object-based localization module 170 is configured to utilize depth data, such as portions of the depth data 138, estimate locations of object instances, object class and instance dependent keypoints, and/or other features of the real-world environment 120. Various multiview reconstruction techniques are described in U.S. Patent Application Publication Nos. 2014/0010407 (published on Jan. 9, 2014 and entitled "Image-Based Localization"), 2013/0254666 (published on Sep. 26, 2013 and entitled "Navigating Images Using Image Based Geometric Alignment and Object Based Controls"), and 2011/0311104 (published on Dec. 22, 2011 and entitled "Multi-Stage Linear Structure from Motion"), which are each incorporated by reference herein in their entireties.

The object-based localization module 170 may be configured to generate records for the selected local object instances 258, and update those records in response to new frame data 210, including some of all of the fields in the following example pseudocode schema:

LocalObjectInstanceSchema{
ObjectInstanceID : A global identifier for a specific instance of an object class. The same value may be used in and obtained from a corresponding object record maintained by the object instance database 260.
ObjectClass : Associated object class identifier (for example, for the "fire_extinguisher", "ceiling_exit_sign", or "human" classes above). In some examples, there may be an accompanying confidence value. In some examples, multiple object classes may be identified as being associated with an object instance.
ObjectKeypoints : 2D coordinates of detected object class and instance dependent keypoints for the detected object in image data 242 for one or more of the location frame records 247.
3DKeypoints : Projections of 3D coordinates (for example, a 3D bounding box) of the object defined with respect to a 3D model used for generating training data for a keypoint detection model 232 for an associated object class.
Keyframes : Frame records 246 in which the object Instance has been detected. Corresponding portions of image data 242 and estimated frame poses 244 may be obtained from the frame records 246.

```
3DObjectKeypoints : Reconstructed 3D points corresponding to the
detected
    object class and instance dependent keypoints for the detected
    object; reconstructed using keyframes and keyframe poses.
}
```

The pose estimation may be based on at least data from such records for the selected local object instances 258. Techniques such as RANSAC may be employed to generate the object-based pose estimate 172. In some implementations, such records for the selected local object instances 258 may be temporarily retained by the object-based localization module 170, such as according to a most recently used (MRU) policy based on, for example, inclusion of the corresponding object instance in the selected object instances 258. The object-based localization module 170 may be configured to supplement and refine the retained records based on newly generated frame records 246. For example, a confidence value for an object class may increase based on object classifications for additional frames, additional keyframes may be identified, and/or more accurate and/or precise reconstructed 3D points may be generated by using additional keyframes.

In some implementations, for high precision with robustness, in addition to using the local object class and instance dependent keypoints 272 as discussed above, object-independent appearance features (such as, but not limited to, SIFT, ORB, and DoH-DAISY) may be identified within the image data 242 for the keyframes, providing additional landmarks for pose estimation.

The object-based localization module 170 is configured to, based on information generated by the object-based location module 170 for the selected local object instances 258 and the local object keypoints 272, update corresponding object instance records maintained by the object instance database 260, corresponding location records 249 (for example, the current location record 252) maintained by the location database 248, and/or corresponding frame records 246. For example, in response to determining a location for one of the selected local object instances 258, the corresponding object instance record in the object instance database 260 may be updated and/or a signature reflecting a relate arrangement of object instances for the current location record 252 may be updated. Thus, as new and improved information for object instances and keypoints is generated by the object-based localization module 170, map details recorded in the location database 249 and the object instance database 260 to increase the accuracy and precision of the map.

Figure 4:
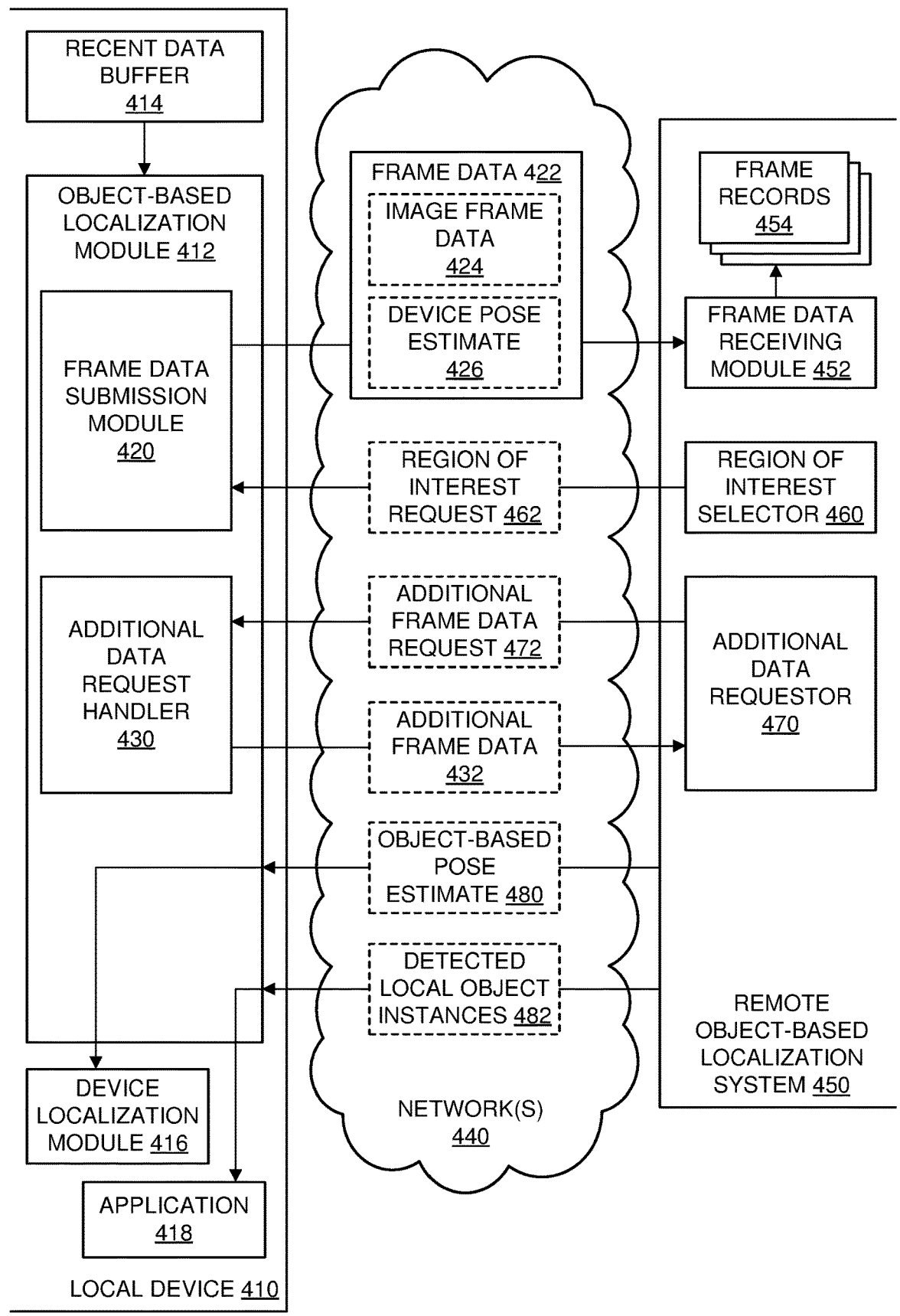
FIG. 4 illustrates an example in which the object-based localization described in connection with FIG. 2 is implemented by a remote object-based localization system remotely located from a local device.

Due to demands in terms of processing capability, storage capacity, and/or energy consumption, many of the operations performed by the object-based localization system 170, such as the object detection and classification performed by the object detector and classifier 220, may preferably be performed outside of the local device 110. For example, many portable or low-power devices are not well suited to perform such processing. FIG. 4 illustrates an example in which the object-based localization described in connection with FIG. 2 is implemented by a remote object-based localization system 450 remotely located from a local device 410. The local device 410 may include any of the features described in FIG. 1 for the local device 110, and may also be referred to as a "client device" of the remote object-based localization system 450. The local device 410 includes an object-based localization module 412 that interacts with other elements of the local system 410 much as the object-based localization module 170 interacts with other elements of the local system 110. However, most of the substantive processing for object-based localization is performed by the remote object-based localization module 412. With this arrangement, the local device 410 can leverage substantial resources allocated to the remote object-based localization system 450, at a cost of increased network communication.

The local device 410 includes a recent data buffer 414 that may include any of the features described for the recent data buffer 166 in FIG. 1. The object-based localization module 412 is configured to retrieve image frame data and related data from the recent data buffer 414. The object-based localization module 412 includes a frame data submission module 420 which is configured to select frames for submission to the remote object-based localization system 450, and transmit corresponding frame data 422 to a frame data receiving module 452 included in the remote object-based localization system 450. The frame data 422 may include the same data items described for the frame data 210, such as image frame data 424 and device pose estimate 426, and may be processed much as described in FIG. 2, resulting in frame records 454.

In some implementations, the remote object-based localization system 450 includes a region of interest selector 460 that may include any of the features described for the region of interest selector 290 in FIG. 2. In such implementations, the frame data submission module 420 is configured to receive region of interest requests 462 issued by the region of interest selector 460. The frame data submission module 420 is configured to modify its collection and/or transmission of frame data 422 to the frame data receiving module 452. For example, the frame data submission module 420 may submit frames at an increased or decreased rate, increase or decrease a resolution of the transmitted image frame data 424, and/or include or not include image data for specified portions of a surrounding real-world environment.

In some implementations, the remote object-based localization system 450 includes an additional data requestor 470, which may be utilized by other portions of the remote object-based localization system 450 to retrieve additional image frame data from the recent data buffer 414. For example, once a portion of a frame has been identified a corresponding to an object instance, higher resolution image frame data may be requested for object class and instance dependent keypoint detection. In response to an additional frame data request 472 received from the additional data requestor 470, an additional data request handler 430 included in the object-based localization module 412 retrieves the requested data from the recent data buffer 414 and transmits the additional frame data 432 to the additional data requestor 470 in response to the additional frame data request 472.

As described for the object-based localization 170, the remote object-based localization system 450 generates object-based pose estimates 480 for the local device 410, which are transmitted to and received by the object-based localization module 412 and provided to a device localization module 416 much as described for the object-based posed estimate 172 in FIGS. 1 and 2. In some implementations, the remote object-based localization system 450 transmits information identifying detected local object instances 482, which is received by the object-based localization module 412 and provided to an application 418 executing on the local device 410, much as described in connection with the detected local object instances 174 in FIGS. 1 and 2.

Figure 5:
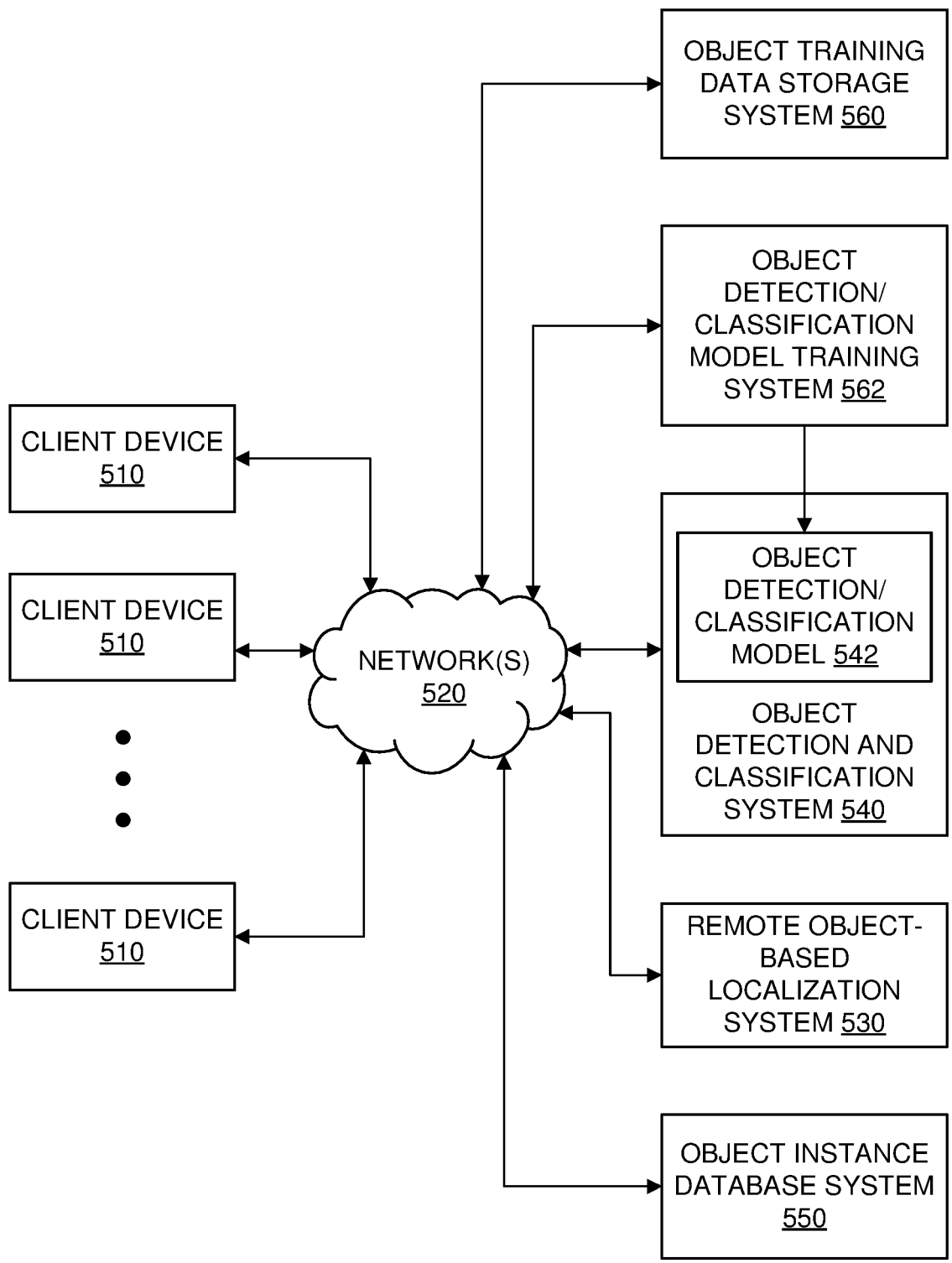
FIG. 5 illustrates an example architecture in which multiple client devices utilize a shared remote object-based localization system for enhanced localization capabilities.

FIG. 5 illustrates an example architecture in which multiple client devices 510 utilize a shared remote object-based localization system 530 for enhanced localization capabilities. From the perspective of the object-based localization system 530, each of the client devices 510 may be referred to as "remote client devices." The remote object-based localization system 530 may include any of the features described for the remote object-based localization system 450, and each of the client devices 510 may include any of the features described for the local device 410 and is configured to perform object-based localization using the remote object-based localization system 530 much as described in connection with FIG. 4. Communication between the various components illustrated in FIG. 5 is performed via one or more data communication network(s) 520.

Various advantages are achieved by the architecture illustrated in FIG. 5 over devices that perform self-contained localization. Each of the client devices 510 may, as a result of its interactions with the common remote object-based localization system 530, contribute to real-world object detection, real-world object classification, object pose detection, object class and instance dependent keypoint detection for real-world objects, object class and instance dependent keypoint location determination (specified with, for example, 3D coordinates), collecting data for new location records, and/or refining data for existing location records for the benefit of other client devices 510. Thus, due to one or more client devices 510 having been used previously at a given location, another client device 510 is able to more quickly, accurately, and precisely perform localization, including determining poses of the client device 510 with respect to a global and/or local coordinate system.

In the example illustrated in FIG. 5, the remote object-based localization system 530 is configured to utilize a separate object detection and classification system 540 to detect physical objects captured in image frame data received from the client devices 510. In some implementations, the remote object-based localization system 530 is configured to utilize multiple such object detection and classification systems 540. The object detection and classification system 540 may include any of the features described for the object detector and classifier 220. The object detection system 540 may be used by various other systems, not shown in FIG. 5, for detecting real-world objects captured in image data. Some implementations include one or more object training data storage systems 560 configured to receive, maintain, and make available training data samples for use by one or more object detection/classification model training systems 562 for training new object detection and/or classification models 542 provided to and employed by the object detection system 540. Thus, as the object and classification detection system 540 improves its ability to detect objects under various conditions and/or increases the number of object classes it can detect, those improvements may be immediately put to use by the remote object-based localization system 530. In some implementations, the remote object-based localization system 530 is configured to automatically identify and submit training data items to the object training data storage system 560.

In the example illustrated in FIG. 5, the remote object-based localization system 530 is also configured to utilize a separate object instance database system 550. In some implementations, the remote object-based localization system 530 is configured to utilize multiple such object instance database systems 550. The object instance database system 550 may include any of the features described for the object instance database 260. The object instance database system 550 may be used by various other systems, including, for example, the client devices 510 and/or other systems not shown in FIG. 5. By making the object instance database system 550 more widely accessible, it allows for more thorough identification and annotation of object instances.

The detailed examples of systems, devices, and techniques described in connection with FIGS. 1-5 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office real-world environment, or a server farm), or may be distributed across multiple geographic locations.

Figure 6:
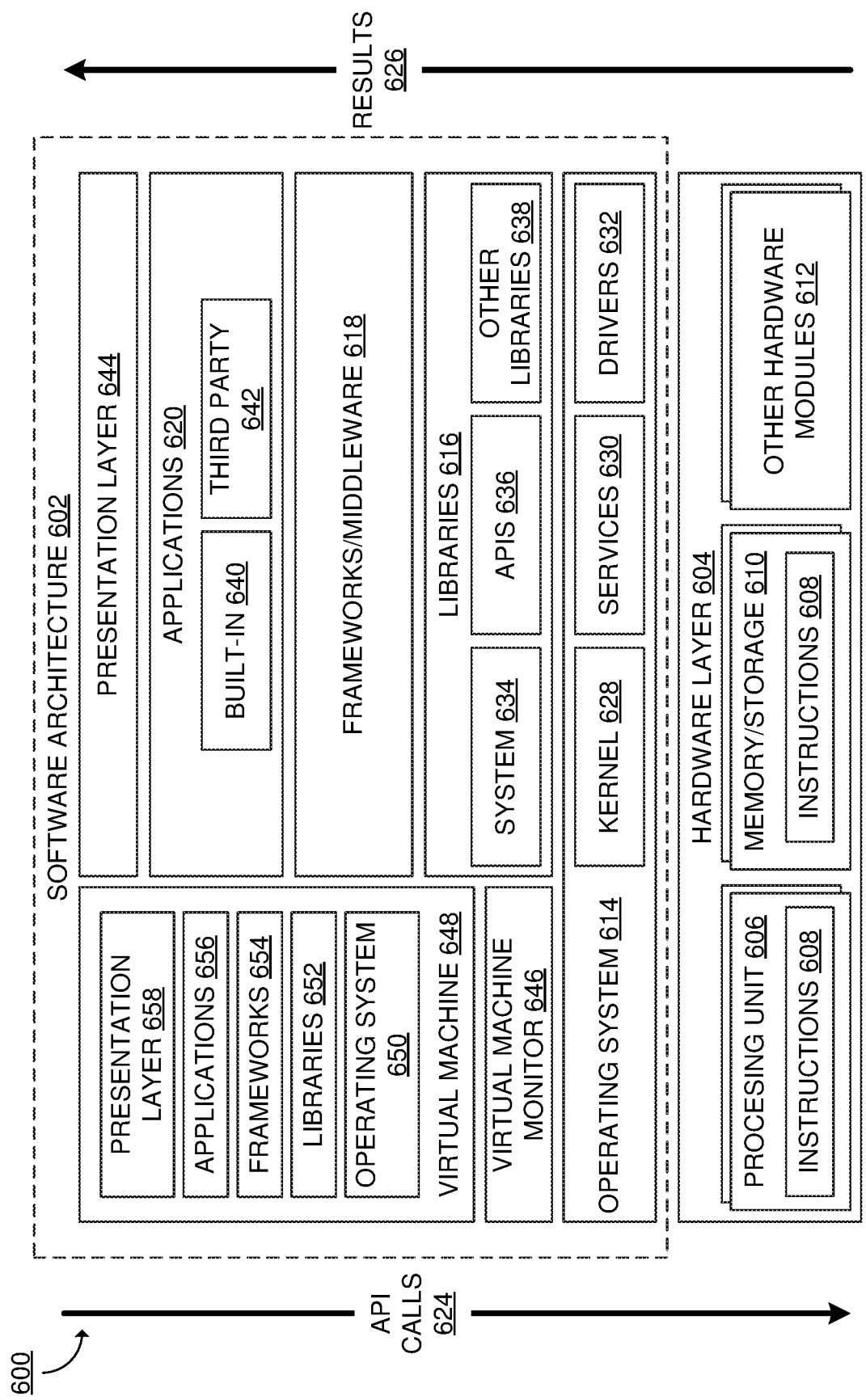
FIG. 6 is a block diagram illustrating an example software architecture, various portions of which may be used in conjunction with various hardware architectures herein described, which may implement any of the above-described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, document storage 770, processors, memory, and input/output (I/O) components. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 67, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
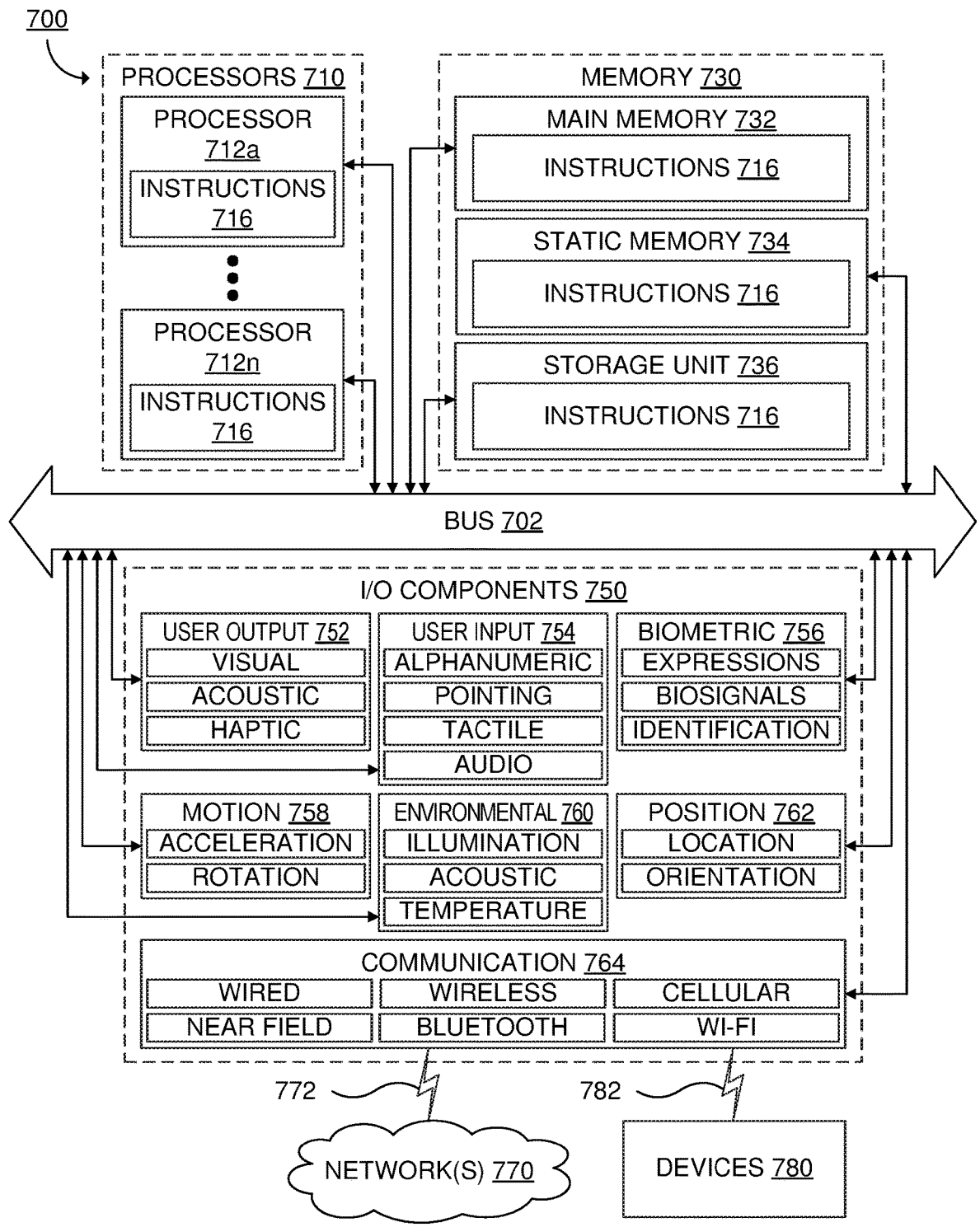
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" include a collection of machines that individually or jointly execute the instructions 77.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a navigation satellite system receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:
1. An object-based localization system comprising:
 a frame data receiving module configured to receive, from a remote client device via a data communication network, image frame data for a plurality of frames captured by an imaging camera included in the remote client device, the plurality of frames including a first frame;
 an object detector configured to receive the image frame data, automatically detect a plurality of real-world objects captured in the image frame data, and auto- matically classify the plurality of real-world objects as being associated with respective object classes;

an object class and instance dependent keypoint selector configured to automatically identify a plurality of object class and instance dependent keypoints for the plurality of real-world objects based on the object classes associated with the plurality of real-world objects;

a location selector module configured to select a current location record from a database based on at least a determination that the object classes associated with the plurality of real-world objects correlate with object classes associated with object instances identified by the selected current location record; and a localization module configured to estimate a first pose of the remote client device for the first frame based on at least the identified plurality of object class and instance dependent keypoints and location data indicated by the selected current location record, and to transmit the estimated first pose to the remote client device.

2. The system of claim 1, wherein:
the system is configured to, using the object detector, automatically detect a first real-world object captured in the image frame data and automatically classify the first real-world object as being associated with a first object class;
the first real-world object is not included in the plurality of real-world objects;
none of the plurality of real-world objects are classified as being associated with the first object class; and
in response to a determination that the first object class associated with the first real-world object is for non-stationary physical objects, the estimation of the first pose is not based on object class and instance dependent keypoints identified for the first real-world object.

3. The system of claim 1, wherein:
the plurality of real-world objects includes a first real-world object;
the object detector is further configured to automatically determine a three-dimensional bounding box for the first real-world object; and
the automatic identification of the plurality of object class and instance dependent keypoints includes selecting one or more vertices of the bounding box as object class and instance dependent keypoints for the first real-world object.

4. The system of claim 1, further comprising a location selector module configured to:
determine a first physical arrangement of the plurality of real-world objects; and
select a current location record from a database based on at least a determination that the first physical arrangement of the plurality of real-world objects correlates with a second physical arrangement of object instances identified by the selected current location record;
wherein the estimation of the first pose is further based on location data indicated by the selected current location record.

5. The system of claim 1, further comprising:
a first machine-trained model trained to detect and classify images of real-world objects; and
a second machine-trained model trained to detect object class and instance dependent keypoints for one or more object classes; wherein:
the object detector is further configured to use the first machine-trained model to detect and classify the plurality of real-world objects, and the object class and instance dependent keypoint selector is further configured to use the second machine-trained model to identify the plurality of object class and instance dependent keypoints.

6. The system of claim 1, further comprising:
a location record selector configured to select, based on a correspondence with the plurality of real-world objects and/or the plurality of object class and instance dependent keypoints, a current location record from a location database; and
a local object detector configured to:
determine that an object database does not include an object instance record corresponding to a first real-world object included in the plurality of real-world objects,
create, in response to the determination that the object database does not include an object instance record corresponding to the first real-world object, a new first object instance record based on information determined for the first real-world object, and
update, in response to the determination that the object database does not include an object instance record corresponding to the first real-world object, the current location record to identify the first object instance record as being associated with the current location record.

7. A method of localizing a device, the method comprising:
receiving, from a remote client device via a data communication network, image frame data for a plurality of frames captured by an imaging camera included in the remote client device, the plurality of frames including a first frame;
automatically detecting a plurality of real-world objects captured in the image frame data;
automatically classifying the plurality of real-world objects as being associated with respective object classes;
automatically identifying a plurality of object class and instance dependent keypoints for the plurality of real-world objects based on the object classes associated with the plurality of real-world objects;
selecting a current location record from a database based on at least a determination that the object classes associated with the plurality of real-world objects correlate with object classes associated with object instances identified by the selected current location record;
estimating a first pose of the remote client device for the first frame based on at least the identified plurality of object class and instance dependent keypoints and location data indicated by the selected current location record; and
transmitting the estimated first pose to the remote client device.

8. The method of claim 7, further comprising:
automatically detecting a first real-world object captured in the image frame data, wherein the first real-world object is not included in the plurality of real-world objects; and
automatically classifying the first real-world object as being associated with a first object class, wherein:
none of the plurality of real-world objects are classified as associated with the first object class, and
in response to a determination that the first object class associated with the first real-world object is for non-stationary real-world objects, the estimation of the first pose is not based on object class and instance dependent keypoints identified for the first real-world object.

9. The method of claim 7, wherein:
the plurality of real-world objects includes a first real-world object;
the method further includes automatically determining a three-dimensional bounding box for the first real-world object; and
the automatic identification of the plurality of object class and instance dependent keypoints includes selecting one or more vertices of the bounding box as object class and instance dependent keypoints for the first real-world object.

10. The method of claim 7, further comprising:
determining a first physical arrangement of the plurality of real-world objects;
selecting a current location record from a database based on at least a determination that the first physical arrangement of the plurality of real-world objects correlates with a second physical arrangement of object instances identified by the selected current location record;
wherein the estimation of the first pose is further based on location data indicated by the selected current location record.

11. The method of claim 7, wherein:
the detection of the plurality of real-world objects includes use of a machine-trained model trained to detect classify images of real-world objects; and
the identification of the plurality of object class and instance dependent keypoints includes use of a machine-trained model trained to detect object class and instance dependent keypoints for one or more object classes.

12. The method of claim 7, further comprising:
determining that an object database does not include an object instance record corresponding to a first real-world object included in the plurality of real-world objects;
creating, in response to the determination that the object database does not include an object instance record corresponding to the first real-world object, a new first object instance record based on information determined for the first real-world object;
selecting, based on a correspondence with the plurality of real-world objects and/or the plurality of object class and instance dependent keypoints, a current location record from a location database; and
updating, in response to the determination that the object database does not include an object instance record corresponding to the first real-world object, the current location record to identify the first object instance record as being associated with the current location record.

13. A non-transitory machine-readable medium including instructions recorded thereon which, when executed by one or more processors, cause the processors to perform the method of claim 7.

14. A method of localizing a device, the method comprising:
capturing, with an imaging camera included in the device, image frame data for a plurality of frames at a rate based at least in part on whether the imaging camera is capturing image frame data associated with a region of interest, the plurality of frames including a first frame captured at a first time;
transmitting, via a data communication network, the image frame data from the device to a remote object-based localization system;
receiving, at the device at a second time, a first pose estimate generated by the remote object-based localization system for the device for the first time; and
determining, at the device, a second pose estimate of the device for a third time after the second time based on at least the received first pose estimate, wherein the second pose estimate is different than the first pose estimate.

15. The method of claim 14, further comprising:
capturing motion data with a motion sensor included in the device for motion of the device occurring after the first time and before the second time;
wherein the determination of the second pose estimate is further based on the captured motion data.

16. The method of claim 14, further comprising, for each frame in the plurality of frames:
determining a frame pose estimate for the device corresponding to a time at which the frame was captured by the imaging device; and
transmitting the frame pose estimate to the remote object-based localization system.

17. The method of claim 14, further comprising receiving, at the device, an identification of an object instance detected in the image frame data by the remote object-based localization system, wherein the object instance corresponds to a real-world object.

18. A non-transitory machine-readable medium including instructions recorded thereon which, when executed by one or more processors, cause the processors to perform the method of claim 14.

* * * * *